March 5, 1946. J. G. OETZEL 2,395,904
METHOD OF AND MECHANISM FOR BRAKING HEAVY DUTY AUTOMOTIVE VEHICLES
Filed May 2, 1942 3 Sheets-Sheet 1
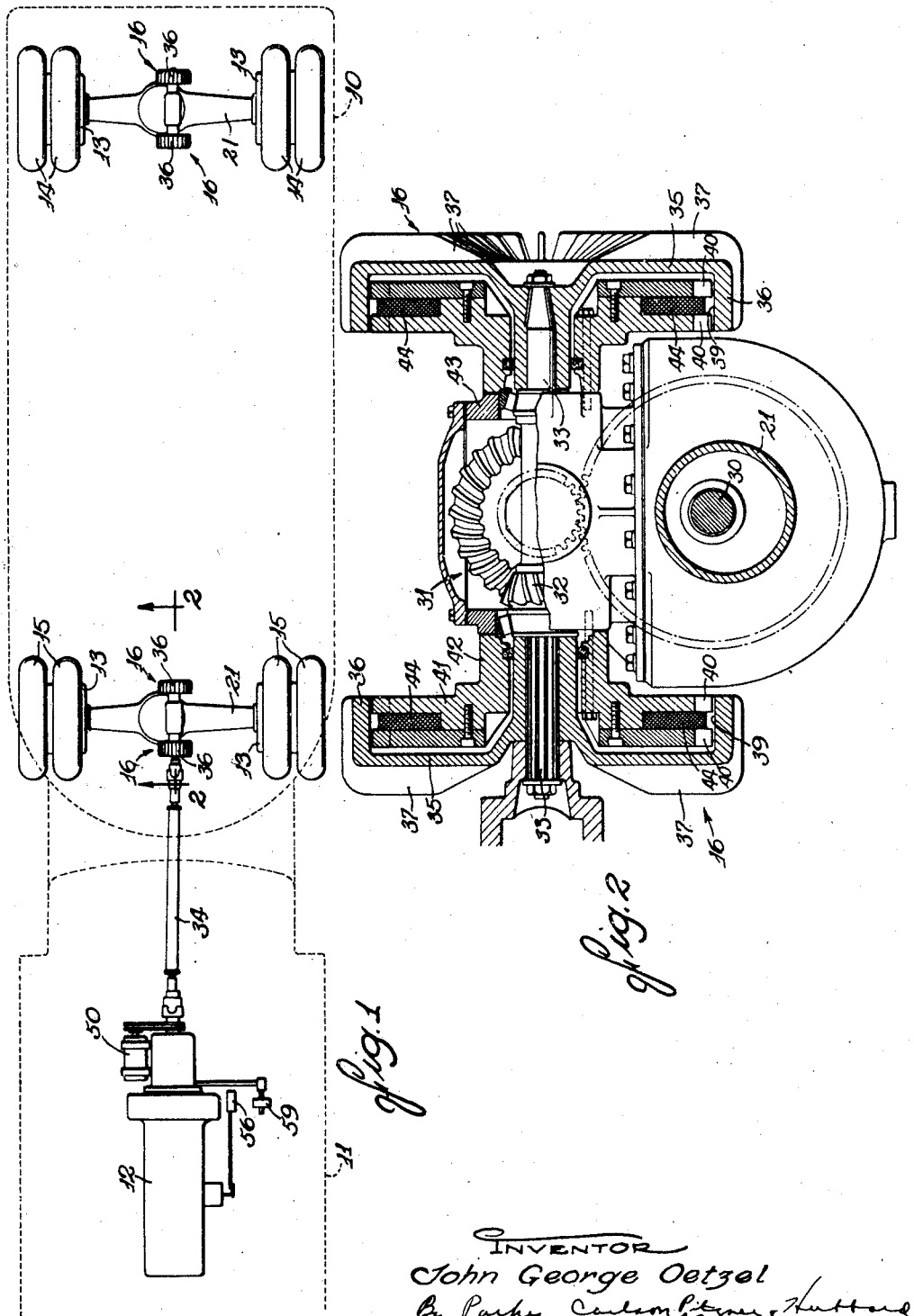
INVENTOR
John George Oetzel
By Parker, Carlson, Pyne & Hubbard
ATTORNEYS March 5, 1946.  J. G. OETZEL  2,395,904
METHOD OF AND MECHANISM FOR BRAKING HEAVY DUTY AUTOMOTIVE VEHICLES
Filed May 2, 1942  3 Sheets-Sheet 2
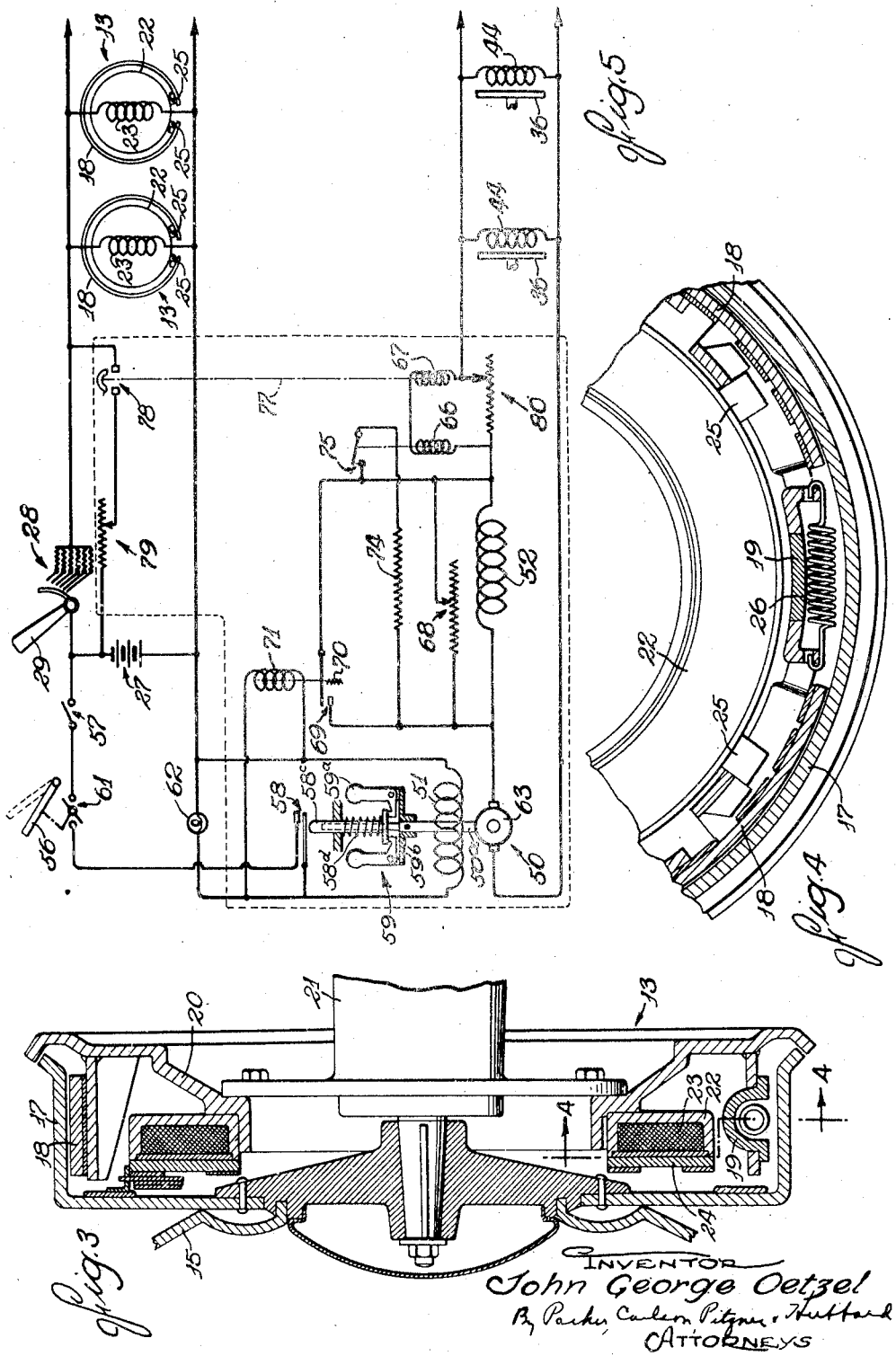
INVENTOR
John George Oetzel
By Parker, Carlson, Pitzner & Hubbard
ATTORNEYS March 5, 1946. J. G. OETZEL 2,395,904
METHOD OF AND MECHANISM FOR BRAKING HEAVY DUTY AUTOMOTIVE VEHICLES
Filed May 2, 1942 3 Sheets-Sheet 3
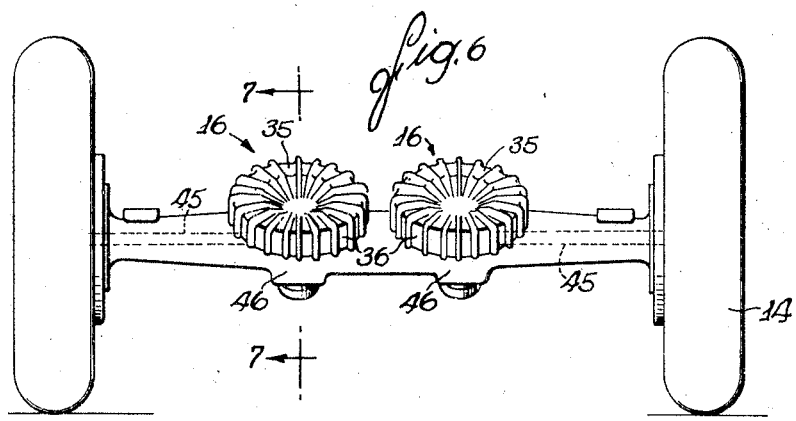
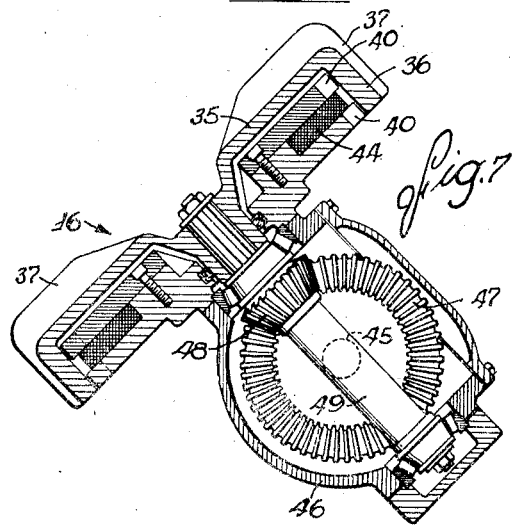
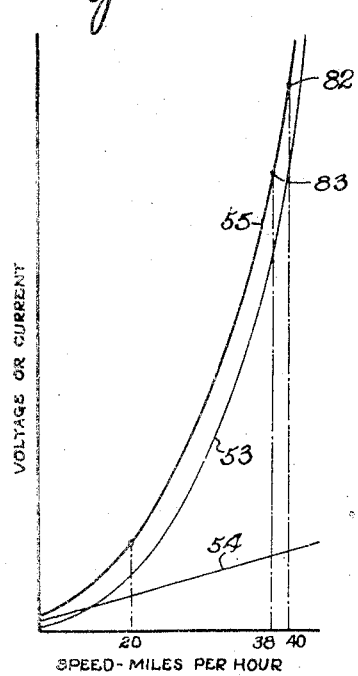
INVENTOR
John George Oetzel
ATTORNEYS Patented Mar. 5, 1946

2,395,904

UNITED STATES PATENT OFFICE 2,395,904

METHOD OF AND MECHANISM FOR BRAKING HEAVY-DUTY AUTOMOTIVE VEHICLES

John George Oetzel, Beloit, Wis., assignor to Warner Electric Brake Manufacturing Company, Beloit, Wis., a corporation of Illinois Application May 2, 1942, Serial No. 441,486

16 Claims. (Cl. 188—181)

The invention relates to the retarding of vehicles such as trucks or truck and trailer combinations on long and comparatively steep mountain grades. Braking systems now in common use have proved inadequate except at very low speeds because the wheel constructions do not permit of proper dissipation of the frictional heat from the wheel brakes. To avoid deterioration of the linings by overheating or damage to the vehicle motor by excessive speed, it is necessary to operate the vehicle in one of the low gear ratios far below safe driving speeds and much too slowly to maintain modern transportation schedules. For example, it can be shown by computation that a typical modern semi-trailer vehicle having a gross weight of 32,500 pounds and equipped with modern friction brakes can safely descend a long ten per cent grade in third gear at no more than fifteen to twenty miles per hour without overheating the brakes or damaging the motor. Using a lower gear ratio to make the motor friction more effective in retarding the vehicle increases the danger of damaging the motor by overspeeding unless a lower vehicle speed is maintained.

The general object is to increase the permissible speed of descent of a vehicle down long steep grades to near the safe driving speed without overheating the brakes or overspeeding the engine.

A more detailed object is to apply a major portion of the retarding effect electrodynamically and variably with the speed of the coasting vehicle and to supplement this effect intermittently and automatically by frictional braking in response to rises in the vehicle speed above a value considered safe for driving.

Another object is to utilize a vehicle driven electric generator not only to energize the electrodynamic brake variably in accordance with the vehicle speed but to perform other functions in connection with the automatic control of the main and auxiliary brakes.

A further object is to correlate the characteristics of the generator with the speed characteristics desired in the automatic control of the brakes.

Still another object is to provide for disabling the automatic brake control at the proper times.

The invention also resides in the novel manner of interlocking the controls for the main and auxiliary brakes so that each operates to protect the other under severe operating conditions.

Other objects and advantages of the invention will become apparent from the following detailed description taken in connection with the accompanying drawings, in which Figure 1 is a plan view of the wheel and axle assemblies and the power plant of a truck and semi-trailer combination equipped with a braking system embodying the present invention, the truck and trailer bodies being shown in phantom.

Fig. 2 is a sectional view taken along the line 2—2 of Fig. 1.

Fig. 3 is a cross sectional view of a typical wheel brake.

Fig. 4 is a section taken along the line 4—4 of Fig. 3.

Fig. 5 is a schematic view and wiring diagram of the automatic control.

Fig. 6 is an elevational view of a trailer axle assembly illustrating a modified form of drive for the electrodynamic brakes.

Fig. 7 is a sectional view taken along the line 7—7 of Fig. 6.

Fig. 8 shows the characteristics of the generator as well as its separate fields.

For purposes of illustration, the invention has been shown as applied to the control of main and auxiliary brakes on a heavy duty vehicle comprising a semi-trailer 10 and truck or tractor 11 driven by an internal combustion engine 12. The main brakes 13 which are applied to the trailer wheels 14, the rear truck wheels 15 and the front truck wheels are of the friction type preferably having independent electrically controlled momentum operators. The auxiliary brakes 16 are applied singly or in tandem to the rear axles of the truck and trailer and operate electrodynamically, preferably being of the eddy current type.

In one of its aspects, the invention contemplates a novel method of controlling the two braking systems so as to maintain maximum safe driving speeds of the vehicle in descending long grades without however exceeding the capacity of either braking system or overloading the engine. The method involves converting a portion of the kinetic energy of the vehicle into an electrodynamic retarding effect applied continuously and changing progressively with the vehicle speed, and applying a predetermined frictional braking effect in response to rises in the vehicle speed above a predetermined desired value. The major part of the total braking required for maintaining the desired speed on long steep declines is supplied continuously and electrodynamically and the remainder is developed intermittently in the main vehicle brakes so as to allow for proper dissipation of the frictional heat. By thus utilizing the electrodynamic braking only at comparatively high speeds so as to utilize this type of braking efficiently and by properly distributing the total braking load on steep grades between the electrodynamic and friction brakes, ample retarding capacity is obtainable while maintaining the auxiliary system of practicable size and cost.

Referring to Figs. 3 and 4, the main or wheel brakes as shown herein comprise drums 17 rotatable with the truck or trailer wheels and coacting with a friction element 18 which extends around the internal drum surface with its ends normally drawn against an anchor 19 on a plate 20 carried by the axle housing 21. A magnet ring 22 is mounted to oscillate on the anchor plate and has a winding 23 disposed between annular magnetic poles which coact with an armature ring 24 rotatable with the drum.

When the winding is energized with the vehicle moving, the magnet and armature surfaces are brought into gripping engagement, the magnet turning in the direction of drum rotation. One or the other of two lugs 25 on the magnet moves its shoe end away from the anchor 19 and expands the friction element against the drum after which the magnet slips relative to the armature, the braking effect developed being proportional to the current energizing the magnet winding. Springs 26 return the parts to normal positions, thereby releasing the brakes when their windings become deenergized.

For normal operation and for stopping the vehicle, the windings 23 of the friction brakes are connected in parallel in a circuit including the vehicle battery 27 (Fig. 5) and a rheostat controller 28. The latter is actuated either by a hand lever 29 or by the usual brake pedal of the truck to cause energization of the windings 23 and vary the degree of such energization and thereby correspondingly adjust the frictional braking effect.

In order to facilitate rapid dissipation of the heat developed, the eddy current brakes 16 are of special construction and located for the free circulation of air around them. Herein, they are spaced inwardly from the rear truck and trailer wheels and are disposed above the axles. As shown in Fig. 2, the truck axle 30 is driven through speed reduction gearing 31 including a bevel pinion 32 on a shaft 33 which is disposed somewhat above the axle housing 21 and is connected in the usual way to the vehicle propeller shaft 34.

In the present instance, an eddy current brake is provided at each end of the shaft 33. Each brake includes a plate 35 fast on one end of the shaft 33 and having a flange or drum 36, preferably composed of cast iron. To facilitate radiation of heat, fins 37 are formed on the exterior of the plate 35 and the drum 36.

The internal drum surface 39 is smooth and is disposed close to the outwardly facing poles 40 of a magnet ring 41 whose hub 42 is bolted to the gear housing 43. An annular winding 44 is disposed between the poles which may, if desired, be constructed with annularly spaced teeth as shown.

When the winding 44 is energized, magnetic flux threads the circuit around the winding including the drum or inductor 36 creating eddy currents in the latter. The magnet being stationary, a retarding effect is thus exerted on the drum and therefore on the vehicle axle, the magnitude of this effect being proportional to the vehicle speed and the energizing current.

If desired, the same axle construction may be employed on the trailer in order to obtain a high speed of the eddy current inductor. Or, a special axle may be employed as shown in Figs. 6 and 7. As before, the opposite trailer wheels are fast on separate axles 45 journaled in a housing 46 and each carrying a bevel gear 47 at its inner end meshing with a pinion 48 to multiply the axle speed in the desired ratio. The pinion is on a shaft 49 carrying the hub of the eddy current brake drum 36 which preferably is inclined forwardly as shown so as to intercept the air currents created by the vehicle motion and thus provide for efficient cooling. By employing separate axles 46, the necessity of a differential is avoided.

It will be observed that because of the gearing, the drums 36 of both the trailer and truck are driven at speeds substantially greater, usually about six to ten times in standard trucks, than the axles so that efficient electrodynamic action is obtained at vehicle speeds substantially below those considered safe in coasting down long mountain grades. Because of this and the efficient cooling action obtained by virtue of the location of the brakes and the exposure of their drums, it is possible to provide the required amount of frictionless auxiliary braking at a comparatively low cost. It is desirable, in order to properly dissipate the heat generated in the drums 36, to distribute the auxiliary braking to as many of the axles as possible and to arrange the brakes 16 in tandem in the case of very heavy vehicles.

The total eddy current braking capacity required for a vehicle of given weight will vary with conditions under which the vehicle is to be operated. In general, the auxiliary system should be capable of supplying the major portion, preferably about seventy per cent, of the total retarding effect required to maintain a safe driving speed, usually about forty miles per hour, on the steepest grade normally encountered, this being about eight per cent according to present road building practice in mountainous regions. That is to say, the eddy current brakes should be capable of preventing acceleration of the vehicle coasting down a six per cent grade, the additional retarding required in order to maintain the same speed on steeper grades being supplied intermittently by the wheel brakes 13.

Current for energizing the eddy current brake windings 44 on both vehicles is preferably derived by an electric generator 50 which may be mounted on the truck and driven as by a belt from the propeller shaft 34. For reasons to appear later, the generator is of the compound type having a shunt winding 51 and a series winding 52, the latter producing a heavily predominant field and therefore a steep characteristic curve 53 (Fig. 8). The shunt characteristic 54 is added to this producing a resultant speed-voltage characteristic as shown by the curve 55.

Effective energization of the eddy current brakes from the generator takes place automatically as an incident to normal operation of the vehicle but is dependent on certain conditions one of which includes the release of the accelerator pedal or throttle 56 to full idling position at which a switch 61 is closed.

Thus, the eddy current brakes are disabled at all times when the accelerator is depressed to apply power to the vehicle.

To disable the automatic brakes during gear shifting a switch 58 is included in the control circuit. This switch is responsive to the vehicle speed and for this purpose may be actuated by a centrifugal device 59 comprising flyweights 59ª on a head 59ᵇ which may be driven from the generator shaft 50ᵃ. When the vehicle speed exceeds a predetermined value, for example, twenty-five miles an hour, below which gear shifting is usually effected, the flyweights move outwardly and shift a sleeve 58ᶜ against the action of a spring 58ᵈ sufficiently to hold the switch 58 closed. Below this selected speed, the switch is allowed to remain open and the circuit is disabled.

Also included in the generator field circuit is the engine ignition switch 57 which operates to prevent draining of the battery when the vehicle is not in use.

In the present instance, the switches 57, 58 and 61 are interposed in series in a circuit including the battery 27 and the shunt winding 51 of the generator. Energization of this winding, as indicated by lighting of a signal lamp 62 on the vehicle dash, occurs when the ignition switch is closed, when the vehicle is traveling above normal gear shifting speeds as evidenced by closure of the switch 58, and when the accelerator is fully retracted, the latter being the natural position of the pedal while the vehicle is traversing a down grade.

The windings 44 of all of the eddy current brakes are connected in parallel in a circuit which extends through the generator armature 63, the series field winding 52, and relay windings 66 and 67. Effective energization of the windings 44 and the degree of such energization is controlled by shunts in parallel with the series winding 52 and the relay winding 66. One of these includes a rheostat 68 which is adjustable to vary the degree of energization of the brake windings for a given output current of the generator and therefore the speed of the vehicle. This may, if desired, be located in the truck cab. A second one of the shunts includes a switch 69 normally closed by a spring 70 and opened by energization of a relay winding 71, which winding is in parallel with the shunt generator field 51. Thus, whenever the shunt field is deenergized, the series field is short-circuited through the switch 69 and the generator is disabled.

A third shunt includes a resistance 74 and a switch 75 which is closed when the winding 66 is energized to a predetermined degree corresponding to the maximum current which may safely be applied to the windings 44. In response to such energization, the switch 75 is closed, the shunt causing a current decrease sufficient to reopen the switch. This process is repeated in rapid succession so that the relay and switch act as a regulator limiting the maximum current applied to the eddy current brakes.

It will be observed that the circuit arrangement above described functions normally to maintain the eddy current brake windings energized continuously whenever the vehicle is coasting down an incline at a speed above that for which the centrifugal switch 58 is adapted to respond and become closed. The energization will vary automatically with the vehicle speed producing an electrodynamic retarding effect which increases with the vehicle speed and which may be varied in degree by adjustment of the rheostat 68. As a result, the vehicle speed will be maintained substantially constant on low down grades where all of the required retarding may be supplied by the auxiliary brakes alone. The speed thus held will be proportional to the grade which the vehicle is descending but will, due to the selected characteristics of the generator, always be near the value selected for safe driving. This will be apparent from Fig. 8 wherein it will be observed that the steep portion of the generator curve 55 is positioned within a comparatively narrow speed range near forty miles per hour. It follows, therefore, that the eddy brakes, although becoming effective at a speed of twenty-five miles per hour, for example, do not exert a substantial retarding effect until somewhat higher speeds are attained.

By adjustment of the above described shunt 68 and a shunt 80, it will be apparent that the generator characteristics may be changed as desired. This is advantageous in adapting the eddy current braking to the prevailing vehicle load and the number of vehicles included in the train. The adjustment enables the generator to be conditioned for producing a constant voltage at different amperages.

In the event that the auxiliary brakes when operating at maximum capacity are incapable of holding the vehicle speed below the desired safe driving speed, means is brought into play to activate the main or friction brakes 13 and reduce the vehicle speed to such desired value. Herein, the speed detecting means comprises the relay winding 67 acting on an armature 77 which is connected to a switch 78 normally biased open. The switch and an adjustable rheostat 79 are connected in the main brake control circuit in parallel with the controller 28 so that the friction brakes will be energized independently by closure of the switch 78. The amount of braking thus produced is determined by the setting of the rheostat 79. The vehicle speed at which the wheel brakes become effective may be varied as desired by adjustment of a rheostat 80 arranged in parallel with the relay windings 66 and 67. By placing the winding 66 in parallel with this rheostat, the speed at which the current limiting switch 75 responds will also be changed correspondingly, this latter speed always being slightly above that at which the switch 78 is closed by the relay 67.

It will be observed from Fig. 8 that the points 82 and 83 at which the relay 67 is effectively energized and deenergized to actuate the switch 78 are on the steep portion of the generator curve 55. The main switches are applied and released at well defined speeds and only a small deceleration of the vehicle after application of the wheel brakes is required in order to deenergize the relay. As a result, these brakes remain applied for comparatively short intervals. This avoids any possible overheating of the friction surfaces considering the substantially longer intervals which elapse between successive applications before the vehicle again accelerates, against the eddy current retarding effect, to the speed at which the wheel brakes are again applied.

The various relays and switches utilized in the automatic control of the eddy current or main brakes may be located adjacent each other in a compact unit and enclosed in a common casing indicated by the dotted line in Fig. 5. This unit may include the generator.

With the automatic coasting control above described, the dual braking system operates as follows under various conditions encountered in service. When the vehicle is being driven by its motor 12, the accelerator 56 will be depressed and the manual controller 28 will be released, both sets of brakes being released and both fields of the generator being deenergized due to the open condition of the switch 61. Under such conditions, the friction brakes would be applied in the usual way by manipulating the controller 29 when it is desired to check or arrest the motion of the vehicle. Preparatory to such application of the wheel brakes, the accelerator pedal would naturally be released so that if the vehicle is operating above the speed for which the switch 58 is set, the eddy current brakes will be applied automatically. Thus, these brakes, although not actually required for such retarding, are available and are brought into play so as to assist the main brakes and thereby prolong the service life of the friction surfaces.

Now, if the vehicle comes to a long down grade, the driver will, with the present control, release the accelerator and proceed without shifting to a low gear. The shunt field of the generator will be excited immediately. If the vehicle is traveling faster than twenty-five miles per hour, the switch 58 will be closed so that the eddy current brake windings will be energized to a degree corresponding to the prevailing vehicle speed. In case the slope is small, that is, less than six per cent, with brakes of the capacity described above, the vehicle motion will be fully checked by the eddy current effect alone and a speed will be established at which the braking effect plus the engine friction at the prevailing gear ratio balance the gravitational force tending to accelerate the vehicle. Except for very gradual grades, the speed thus acquired will usually be between thirty and forty miles per hour. If the established speed is less than that considered safe for driving, the driver may render the eddy current brakes ineffectual simply by depressing the accelerator pedal sufficiently to open the switch 61. When the desired higher speed is attained, the pedal is again released to bring the eddy current brakes into action.

The main or wheel brakes 13 are brought in play when the down hill slope is sufficiently long and steep to accelerate the vehicle to forty miles an hour against the full effect of the eddy current brakes. At this speed, sufficient current is generated to energize the winding 61 to the degree required to close the switch 78. This results in immediate activation of the wheel brakes which create frictionally a retarding force determined by the setting of the rheostat 79. Ordinarily, this force supplements that of the then applied eddy current brakes and is of such magnitude as to decelerate the vehicle quite rapidly to the slightly lower speed, for example, thirty-eight miles per hour, at which the switch 78 is opened. Then, the vehicle again accelerates, but owing to the eddy current effect, a substantial time interval elapse before the switch 78 is again closed and the wheel brakes applied. Thus, the wheel brakes are applied intermittently for short periods with intervening intervals of ample duration to permit of proper dissipation of the frictional heat from the drums 17. In view of the accuracy with which the relay 67 responds to changes in the vehicle speed within the operating range of the wheel brakes, the supplemental frictional braking action is gauged accurately and automatically so that there is no possible danger of these brakes becoming overheated even under the most severe service conditions.

Assume now a road condition under which the retarding effect of both braking systems combined is unable to prevent continued acceleration of the vehicle. To guard against possible damage to the eddy current brakes, the relay 66 becomes energized to close the switch 75 at a speed slightly above that at which the wheel brakes are cut in. This short-circuits the generator field 52 through the resistance 74 causing a decrease in voltage in response to which the relay opens the switch. Such opening and closing of the switch continues so that the relay and switch act as an automatic regulator for limiting the voltage to the eddy current brake windings 44 preventing any possible damage to the latter.

By virtue of the control described above, the total braking load is distributed automatically between the two systems so as to permit of high but safe driving speeds without making the eddy current brakes of sufficient capacity to handle the entire load and without danger of overburdening either system or the engine. Thus, the eddy current or frictionless brakes are utilized whenever possible to supply the entire retarding effect and the wheel brakes, which must be provided for service braking, are used to supplement the eddy current brakes under severe conditions and operate intermittently so as to be protected fully against overheating. Both systems are thus used most efficiently in meeting the varied operating conditions encountered in service use. As a result, the eddy current brakes are of practicable size, their cost is not prohibitive, and they are constructed and located on the vehicle to dissipate heat rapidly.

The eddy current brake per se and the automatic control thereof apart from the friction brake control form the subject matter of my co-pending divisional applications respectively entitled Electrodynamic brake for automotive vehicles and control for vehicle braking system filed January 25, 1946.

I claim as my invention:

1. A braking system for a heavy duty vehicle having, in combination, electrodynamic braking means, frictional braking means, an electric generator driven by the vehicle at a speed proportional to the vehicle motion, a relay automatically operable to cause energization of said electrodynamic braking means by the generated current when the vehicle is descending a grade and the current exceeds a predetermined value, a second relay automatically responsive to increases in the generated current above a predetermined higher value corresponding to said driving speed for the vehicle, and means controlled by said second relay and operable to energize said frictional braking means simultaneously with said electrodynamic braking means and to a degree sufficient to reduce the vehicle speed.

2. A braking system for a heavy duty vehicle having, in combination, electrodynamic braking means, frictional braking means, an electric generator driven by the vehicle at a speed proportional to the vehicle motion, means automatically responsive to the vehicle speed to connect said generator to said electrodynamic braking means when the vehicle is descending a grade above a predetermined speed whereby to produce a frictionless retarding effect proportional to the vehicle speed, and means automatically responsive to increases in the vehicle speed above a desired higher value while the electrodynamic braking effect continues to energize said frictional braking means to a degree sufficient to reduce the vehicle speed below said desired value.

3. A braking system for a heavy duty vehicle having, in combination, electrodynamic braking means, frictional braking means, an electric generator driven by the vehicle at a speed proportional to the vehicle motion and operable during coasting of the vehicle to energize said electrodynamic braking means to a degree which respectively increases and decreases as the vehicle speed increases and decreases, and means automatically responsive to rises in the generated current above a predetermined value to activate said frictional braking means.

4. A vehicle braking system having, in combination, an overcompounded electric generator driven in unison with the vehicle motion and having a predominating series field, electrodynamic braking means energized by said generator, frictional braking means, and means energized from the generator output to energize said electrodynamic braking means above a predetermined vehicle speed and to cause energization of said frictional braking means above a predetermined higher speed.

5. A braking system for a heavy duty vehicle having a foot pedal adapted to be depressed and released, said system having, in combination, electrodynamic braking means, friction braking means, means responsive to release of said pedal to energize said electrodynamic braking means to a degree proportional to the vehicle speed, and means automatically responsive to rises in the vehicle speed above a predetermined value to apply said frictional braking means so long as the speed increase persists.

6. A braking system for a heavy duty vehicle having, in combination, electrodynamic braking means for retarding the vehicle, an electric circuit therefor, means automatically responsive to the vehicle speed and operable during coasting of the vehicle to cause energization of said electrodynamic braking means to a degree which varies progressively and in proportion to the vehicle speed, frictional braking means for retarding the vehicle, and means automatically responsive to current increases in said circuit above a predetermined value to apply said frictional braking means while the current remains above said value.

7. A braking system for a heavy duty vehicle having, in combination, electrodynamic braking means for retarding the vehicle, friction braking means for retarding the vehicle, means operable during coasting of said vehicle to energize said electrodynamic braking means to a degree proportional to and varying progressively with the vehicle speed, and means automatically responsive to intermittent increases in said speed above a predetermined value to apply said fraction braking means to a predetermined degree.

8. A braking system for a heavy duty vehicle having, in combinnation, electrodynamic braking means for retarding the vehicle, friction braking means for retarding the vehicle, means operable during coasting of said vehicle to energize said electrodynamic braking means and increase and decrease the energization as the vehicle speed increases and decreases respectively, and means operable intermittently in response to increases in the vehicle speed above a predetermined value while said electrodynamic braking means remains applied to apoly said friction braking means to a degree sufficient to decelerate the vehicle.

9. A braking system for a heavy duty vehicle having, in combination, frictional braking means, electrodynamic braking means, a circuit therefor, means for energizing said circuit to a degree proportional to the vehicle speed, and a relay having a winding in said circuit and automatically responsive to current increases above a predetermined value to apply said frictional braking means.

10. A braking system for a heavy duty vehicle having, in combination, electrodynamic braking means, frictional braking means, means automatically responsive to the vehicle speed and operable during coasting of the vehicle to cause energization of said electrodynamic braking means to a degree proportional to the vehicle speed, and means automatically responsive to increases in the vehicle speed above a desired value while the electrodynamic braking effect continues to apply said frictional braking means to a predetermined degree sufficient to reduce the vehicle speed below said desired value and terminate such degree of energization when a speed reduction to the latter value has been attained.

11. A braking system for a heavy duty vehicle having, in combination, electrodynamic braking means, frictional braking means, means operable automatically when the vehicle is descending a grade to cause energization of said electrodynamic means to a degree proportional to an increasing or decreasing progressively with the vehicle speed, means automatically responsive to increases in the vehicle speed above a desired value to activate said frictional braking means, and means operable in response to an increase in the vehicle speed to a predetermined value higher than said desired value to prevent further increase in the energization of said electrodynamic braking means.

12. The method of retarding a vehicle while coasting down grade which comprises continuously applying an electrodynamic braking effect constituting a major portion of the total retarding force required to maintain a desired speed of the vehicle, adjusting said effect progressively with and in proportion to changes in vehicle speed up to a desired value, and applying a frictional retarding effect intermittently at a frequency such as to maintain the vehicle speed at said desired value.

13. The method of retarding a vehicle on a long down grade which comprises converting a portion of the kinetic energy of the moving vehicle into an electrodynamic braking effect applied continuously to the vehicle, adjusting such effect progressively with and in proportion to changes in vehicle speed up to a desired value, and in response to intermittent increases in the vehicle speed above said desired value, automatically supplementing said continuous retarding effect with frictionally created braking effects each capable of reducing the vehicle speed to said desired value.

14. The method of retarding a vehicle on a long down grade which comprises converting a portion of the kinetic energy of the moving vehicle into an electric current changing progressively with and in proportion to the vehicle speed, converting said current into an electrodynamic retarding effect proportional in magnitude to the generated current and applied continuously to the vehicle, and applying a predetermined frictional braking effect to the vehicle in response to and during the continuance of a speed increase above a predetermined desired value.

15. A braking system for a vehicle having, in combination, an electric generator driven in unison with the vehicle motion so as to deliver an output variable with the vehicle speed, an electric eddy current brake for the vehicle energized by the output of said generator whereby to produce a retarding action proportional to the vehicle speed, friction braking means having an energizing winding and a circuit therefor and adapted to retard the vehicle motion with a predetermined torque when said circuit is closed, and a magnetic relay having a winding in the output circuit of said generator and operable when energized to a predetermined degree to close said brake circuit and energize said friction braking means.

16. A braking system for a vehicle having, in combination, an electric generator driven in unison with the vehicle motion so as to deliver an output variable with the vehicle speed, an electric eddy current brake for the vehicle energized by the output of said generator whereby to produce a retarding action proportional to the vehicle speed, friction braking means for the vehicle, a control device adapted when actuated to energize said friction braking means, and an electromagnet having a winding energized in accordance with the output of said generator to actuate said device and apply said friction braking means when the vehicle is traveling above a predetermined speed.

JOHN GEORGE OETZEL.